(12) United States Patent
Marks et al.

(10) Patent No.: US 6,589,581 B1
(45) Date of Patent: Jul. 8, 2003

(54) METHOD OF MAKING A COMMERCIAL PACKAGED WATERMELON JUICE DRINK

(75) Inventors: Stella Marks, Foster City, CA (US); Maris Lunt, Foster City, CA (US); Peter Mattson, Foster City, CA (US)

(73) Assignee: Watermelon Works LLC, Woodland, CA (US)

( * ) Notice: Subject to any disclaimer, the term of this patent is extended or adjusted under 35 U.S.C. 154(b) by 0 days.

(21) Appl. No.: 09/788,101

(22) Filed: Feb. 16, 2001

(51) Int. Cl.[7] ................................................ A23L 2/02
(52) U.S. Cl. ................... 426/324; 426/326; 426/330.5; 426/599; 426/489; 426/399
(58) Field of Search ............................ 426/330.5, 599, 426/489, 324, 326, 399

(56) References Cited

U.S. PATENT DOCUMENTS

| 1,479,329 A | * | 1/1924 | Snelling |
| 2,298,328 A | * | 10/1942 | Yawger |

FOREIGN PATENT DOCUMENTS

| CN | 1042823 | * | 6/1990 |
| CN | 1094924 | * | 5/1993 |
| CN | 1083325 | * | 3/1994 |
| CN | 1095909 | * | 12/1994 |
| CN | 1101523 | * | 4/1995 |
| CN | 1102554 | * | 5/1995 |
| CN | 1128113 | * | 8/1996 |
| JP | 04-152869 | * | 5/1992 |
| RU | 2038029 | * | 6/1995 |

OTHER PUBLICATIONS

J. of Food Service Systems, vol. 6, #3, Soc. for Food Service Systems, Food + Nutrition Press. pp. 141–146, Silva et al, 1991.*

Gida, 15(6), 329–332, Research on the Possibility of Using Watermelon in the Fruit Juice Industry (1), Hayoglu et al, 1990.*

Bangladesh J of Scientifical + Industrial Research, XVII (Nos. 1–2), Viddin et al, 1982.*

Japan Scan: Food Industry Bulletin, vol. 10, No. 2, p. 4, Water Melon Sorbets, Apr. 1992.*

"Watermelon Juice with Pulp", Gusina et al Ukrainskii Nauchno–Issled. Inst. Konservnol, Promyshlennosy), USSR Konservnaya. I, Issue 3, pp. 17,18, 1974.*

Indian Food Packer, vol. XLVIII, No. 2, Saini et al A New Method for Mechanized Production of Watermelon Seeds + Juice, Mar./Apr. 1994.*

Gida, 18(6) 369–371, Fenercioglu Research on the Possibility of Using Watermelon Juice in Fruit Juice Cocktails, 1993.*

Bangladesh, J. Agril. Sci. 8(2) 211–215, Uddin et al Preparation of Preserves and Candies from Watermelon Rind, 1981.*

Atlanta Journal—Constitution, Section:Food, p.: H9, Aug. 7, 1997.*

Indian Food Packer, vol. XXXVI, No. 4, p. 23 Plus, Ghosh et al Indian Food Preserves. Assoc., Jul./Aug. 1982.*

J. of Food Science, vol. 45, p. 809 Plus, Hvor et al Formulation and Sensory Evaluation of Fruit Punch Containing Watermelon Juice, 1980.*

(List continued on next page.)

Primary Examiner—Steve Weinstein
(74) Attorney, Agent, or Firm—H. Michael Brucker

(57) ABSTRACT

A process for making a commercial packaged watermelon fruit juice drink in which juice extracted from the whole watermelon, except the seeds, is adjusted by adding water, Carrageenan, malic acid, sweetener and natural flavors and then rapidly heated and cooled before being bottled and drinks made from such processes.

19 Claims, 2 Drawing Sheets

OTHER PUBLICATIONS

Egyptian J. of Food Science, vol. 2, 1, pp. 101–112 El–Akher et al, 1974.*

Chemistry + Technology of Soft Drinks + Fruit Juices Taylor (16–54), Sheffied Academic Press, (File 53), 1998.*

Handbook of Food Analsis, vol. 1 (715–743), Blanco et al, Marcel Dekker Publ. (File 53), 1996.*

At a Glance, 8(2), 1 Inactivation of Alicyclobacillus Sports, Aug. 1999.*

Food Technology, Cherry, 53(11), 54–57, 59, Nov. 1999.*

Dairy Industries Intil, vol. 41(12), pp. 458, 459 Fruit Juice–Milks Doorstep Partner. File 50, Item 2, 1976.*

Dairy Field, 181(2) 35–36 Rice, Longer Shelf Life Benefits Outweigh: Costs File 51, Item 2, 1998.*

Asia Pacific Food Industry 6(10), p. 80, Oct. 1994.*

* cited by examiner

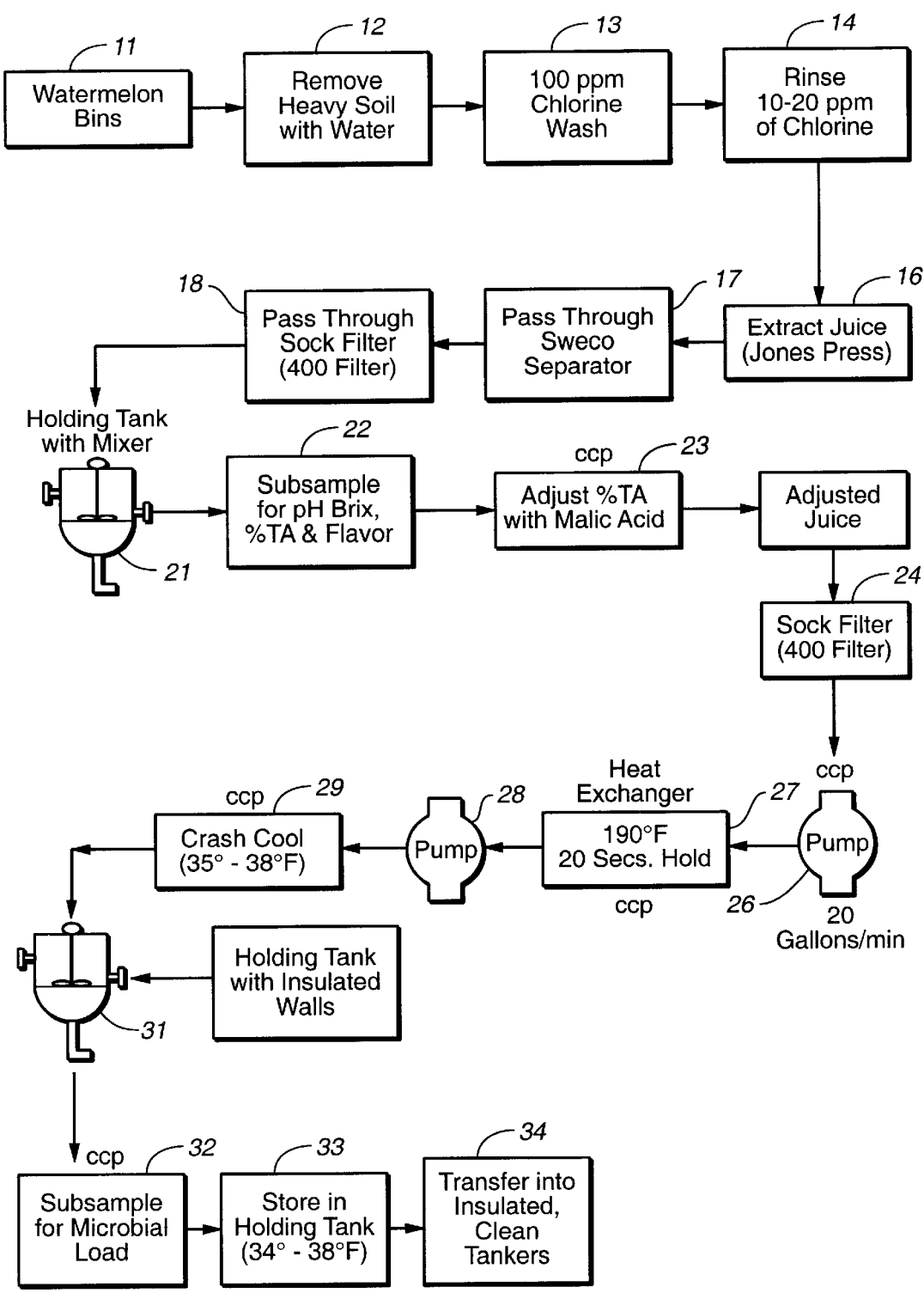
FIG._1

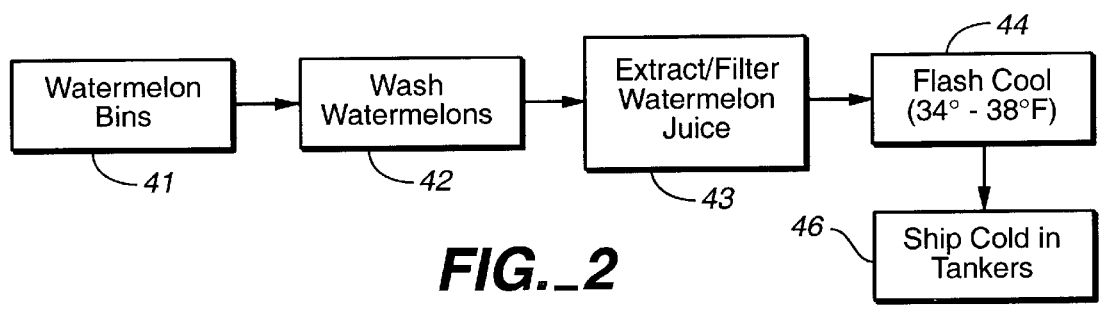
*FIG._2*
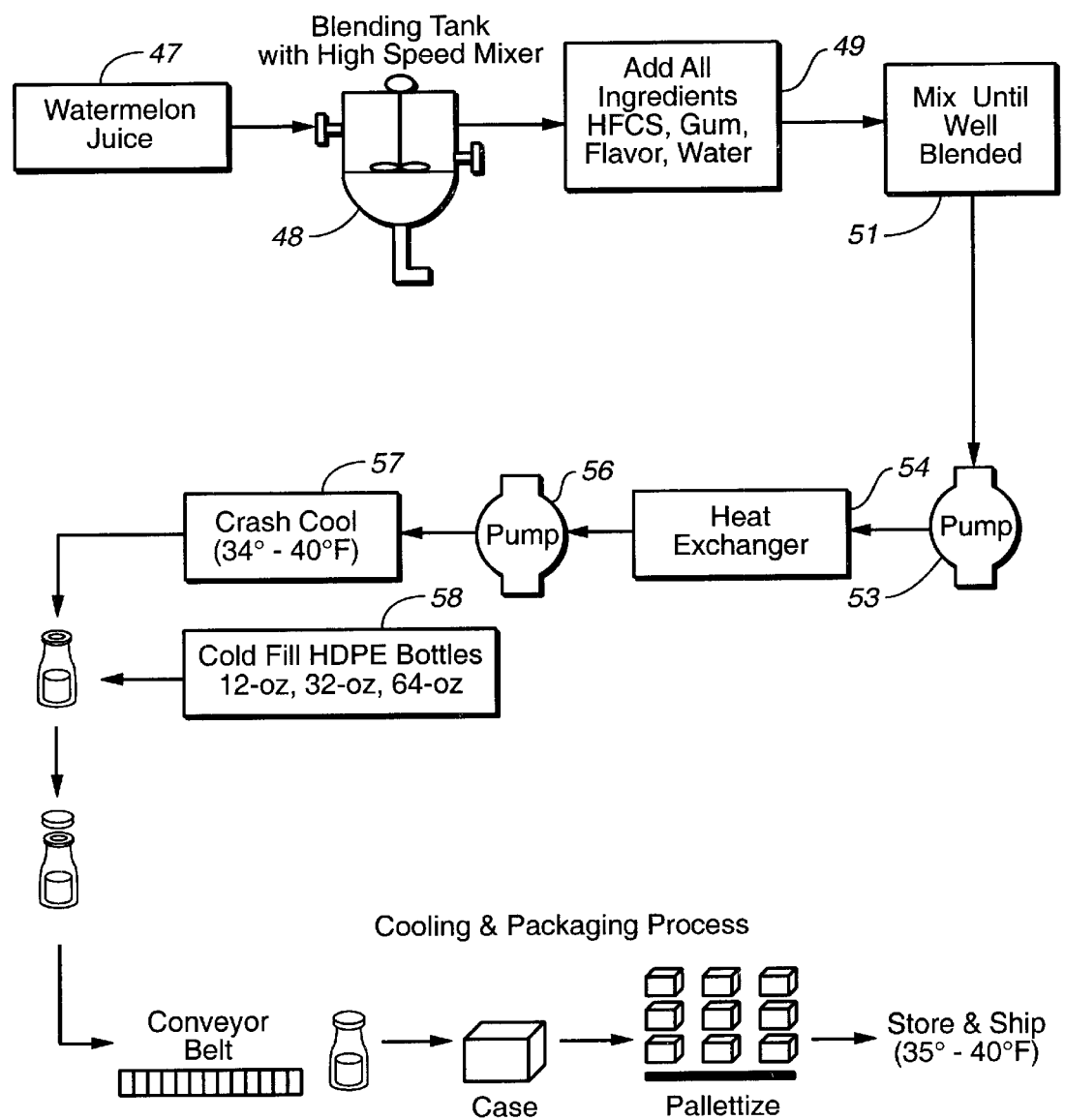
*FIG._3*

US 6,589,581 B1

METHOD OF MAKING A COMMERCIAL PACKAGED WATERMELON JUICE DRINK

FIELD OF THE INVENTION

The present invention relates to fruit juice drinks and processes for the commercial production of packaged fruit juice drinks for mass distribution, and, in particular, to watermelon fruit juice drinks and processes for making same.

BACKGROUND

Watermelon juice, as a beverage, is found almost exclusively as an over-the-counter drink made by hand from the pink flesh of the watermelon fruit. While, in some cultures such as those of Mexico and India, such watermelon drinks are popular, in the United States and elsewhere, watermelon juice drinks are rare, with commercially available packaged watermelon juice drinks virtually unknown.

For the purposes of this description, a typical watermelon is viewed as having three, and sometimes four, components: (1) a relatively hard outer rind typically having a green or greenish color with a thickness of a few millimeters; (2) a firm inner rind having a whitish color and a thickness of a few centimeters; (3) the pink inner fruit flesh which is the part of the watermelon that is typically eaten, and (4) for those watermelons which are not of the seedless variety, flat, usually dark colored, teardrop seeds distributed in the flesh. Because the present invention accommodates both seeded and seedless watermelons, the description of the invention will be with reference to seeded watermelons, with the understanding that any special precautions required by the presence of seeds may not be necessary where the juiced watermelons are seedless.

The commercial production of a packaged watermelon juice drink for mass distribution poses a number of challenges which have not been surmounted prior to the present invention.

These challenges include: (1) minimizing the human handling of the watermelons prior to juicing; (2) extracting from each watermelon the maximum juice available without destroying the desired taste or color; (3) maintaining a color of the packaged juice drink a rich pink of the inside of a watermelon, which color does not turn brown or some other unpleasant tone during production or when exposed to the air; (4) maintaining the fruit pulp in the drink in suspension; (5) extracting from the watermelon those flavor components that one associates with eating watermelon; and (6) delivering the packaged drink to the consumer in a form and at a price that will engender product loyalty for those who enjoy the taste of real watermelon.

SUMMARY OF THE INVENTION

The process for making a watermelon drink of the present invention includes the steps of: washing watermelons from the field prior to extracting their juice; extracting juice from all parts of the watermelon except the seeds; filtering the extracted juice; adjusting the filtered juice by adding water to form a drink and for chemical parameters and taste, and then subjecting the filtered, adjusted drink to a thermal process that first pasteurizes the juice by a fast elevation of temperature, followed by rapid cooling to refrigeration temperature, at which temperature it is maintained until consumed.

Thus, it is an object of the present invention to commercially produce a watermelon juice drink from watermelon juice that can be packaged and widely distributed, and which has the rich pink color of watermelon flesh, and whose consumption approximates the unique taste experience of eating fresh watermelon, and, for those who find the taste of real watermelon pleasing, will buy the product repeatedly.

Because watermelons are large, fragile, heavy and soft, they pose difficulties for any process that requires their handling. For a commercial process handling thousands of watermelons at a time, each of which must be introduced into the process whole and unbroken, the task is particularly daunting.

Thus, it is another object of the present invention to provide methods for the mechanical extraction of watermelon juice from watermelons without first requiring manual preparation of the melons other than washing.

Yet another object of the invention is to produce a watermelon juice drink as described above in large batches and at a cost that permits it to be sold to the consumer at an acceptable price.

These and other objects, aspects and features of the present invention will be better understood from the following detailed description of the preferred embodiments when read in conjunction with the appended drawing figures.

BRIEF DESCRIPTION OF THE DRAWINGS

FIG. 1 is a block diagram illustrating the process steps of one embodiment of the invention;

FIG. 2 is a block diagram illustrating an alternative embodiment of the invention constituting initial steps of a process for making a commercial, packaged watermelon juice drink;

FIG. 3 is a block diagram illustrating an alternative embodiment of the invention constituting final steps of a process for making a commercial, packaged watermelon juice drink.

DETAILED DESCRIPTION OF THE INVENTION

Each of the numbered rectangles (boxes) shown in FIGS. 1, 2 and 3 represent a step in a process for creating a commercial, packaged watermelon juice drink for mass distribution.

By way of an overview and with reference to FIG. 1, process steps 11, 12, 13 and 14 clean the watermelons which are delivered in bins from the fields where they are grown. Process steps 16, 17, 18 and 19 extract and filter the watermelon juice which is then deposited into a holding tank 21. Process steps 22 and 23 add water to make a watermelon juice drink and adjust the juice in the holding tank to meet certain chemical parameters, as well as taste criteria, as more fully described below. Process steps 27 and 29 provide thermal treatment which first raises the temperature of the juice drink to sterilize it and then lowers it to refrigeration temperature to prevent the growth of unwanted microbes. These steps will now be described in greater detail.

Process steps 11, 12, 13 and 14 include, in order: removing the watermelons from the bins in which they are delivered from the fields; washing them with water to remove heavy soil; washing them in a chlorine solution of 100 ppm (parts per million); and then rinsing them in a chlorine solution of 10 to 20 ppm. The melons are now ready for juice extraction.

The washed and rinsed watermelons -and only those still fully intact and unbroken—are then delivered to a Jones press where the entire watermelon—outer rind, inner rind, inner fruit flesh and seeds (if any)—is put under pressure in step 16 to extract juice from the outer rind, inner rind and inner fruit flesh while taking care not to break and extract any juice from any seeds that are present. A Jones press is well known in the art of fruit juice extraction and will be familiar to those skilled in the art and thus need not be described in detail herein. Any other apparatus that can apply pressure to a watermelon and extract its juice (perform process step 16) could also be used. A Jones press can be adjusted to vary the amount of pressure that is applied to the fruit, and, for the purposes of the present invention, that pressure is adjusted so the seeds are not crushed or even broken, as the juice from the inside of the seeds has the adverse effect of turning the juice a dark brown color. At the same time, it is important that the pressure applied to the watermelon fruit be sufficient to extract the maximum juice possible without extracting too much juice from the outer and inner rind, which could cause the juice to be bitter. At the same time, some juice from the inner and outer rind are important components necessary to better approximate the complex flavor of fresh watermelon. Step 16 should yield juice which is 50–80% by weight of the watermelon from which the juice was extracted.

The juice extracted by process step 16 is delivered to a Sweco Separator which performs process step 17 of removing larger pieces of rind and inner watermelon fruit, as well as any other objects, from the extracted juice. Any other apparatus for performing process step 17 could also be used. Smaller particles of rind and inner fruit flesh are removed in step 18 where the juice is passed through a sock filter, having, for example, 400 holes per inch. Other equivalent filter apparatus could also be used.

The filtered watermelon juice from process step 18 is then delivered to a holding (batch) tank 21 which includes a mixer. The watermelon juice mixed in the holding tank 21 is, by process step 22, sampled to determine its pH, percentage Brix (°Brix), percentage titratable acid as malic (TA) and flavor.

While the juice is still in the holding tank 21 and based on the results of process step 22, the following are added to the juice to make it a drink as process step 23: water, Carrageenan (polysaccharide), high fructose corn syrup and malic acid.

In some plants, a liquefier is used to mix the water, sweetener and Carrageenan before it is added to the holding tank, but this is considered equivalent to the use of a batch tank only and does not change the invention.

Water is added to the batch tank 21 so that the final fruit juice drink is approximately 65% watermelon juice and 26% added water. While these figures represent a preferred embodiment, depending on the watermelons used, the percentage of watermelon juice can vary within a range of 57% to 74%, and the water within a range of 17% to 34%.

The °Brix of a typical ripe watermelon is usually approximately 6 to 8, where the desired sweetness for the drink is in a range of 10 to 13, and preferably 11.0 to 11.3. High fructose corn syrup or other suitable commercially available sweeteners are added to increase the °Brix of the drink to bring it within the desired range.

Malic acid is added as necessary to bring the percent TA of the drink to within the range 0.27 to 0.33. Within that range, the pH of the juice drink will be below 4.6, and preferably at or below 4.3 in a range of 3.8 to 4.3 In order to prevent the growth of pathogens.

Carrageenan is added to keep the solids of the watermelon juice, which tends to settle, in suspension. Natural flavors can be added to enhance the taste.

Once all of the adjustments are made in process step 23, the juice drink is filtered by process step 24 by passing it through a filter such as a sock filter, preferably of 400 holes per inch. It will occur to those skilled in the art that other filtering apparatus could be used.

The filtered juice drink from process 24 is then exposed to a unique thermal process in which the drink is rapidly heated and then crash cooled to refrigeration temperature—just above freezing—at which temperature it is maintained throughout the bottling, shipping and storage process. The bottled watermelon juice drink of the present invention is then maintained in refrigeration cabinets from which it is purchased by consumers.

Referring once again to FIG. 1, a pump 26 delivers the filtered and adjusted juice drink, after completion of process step 24, to a heat exchanger 27 where the juice is quickly raised to a temperature of between 170 and 190 degrees Fahrenheit, preferable approximately 190 degrees, and held there for 10 to 30 seconds and preferably 20 seconds. The pump 26 may preferably be one that pumps at the rate of 20 gallons per minute so that the time of the drink within the heat exchanger at 190 degrees Fahrenheit is approximately 20 seconds. A second pump 28 delivers the heated juice drink from heat exchanger 27 to a crash cooler 29 where the temperature of the juice drink is lowered to refrigeration temperature—between 33 and 42 degrees Fahrenheit, and in the preferred embodiment, between 35 and 38 degrees Fahrenheit. The juice drink is then delivered from crash cooler 29 to an insulated holding tank 31 where it can be conveniently sampled for microbial lode in process step 32 before being delivered to an insulated holding tank 33 where the juice drink is maintained at approximately the temperature established in the crash cooler 29. There the bottling plant Is at a different location than the juice extraction plant, the juice drink in tank 33 is transferred into insulated clean tankers 34 which deliver it to a bottling plant while maintaining it at the desired temperature of between 34 and 40 degrees Fahrenheit.

The foregoing process includes all of the steps for adjusting the juice extracted from the watermelons and subjecting it to the thermal process, after which it is ready for bottling as a drink, either at the location where the other process steps took place or at some remote location to which the drink is transferred by tankers.

In an alternative embodiment of the invention, illustrated in FIG. 2, watermelons delivered from the field in bins 41 are subjected to a washing process 42, which includes the steps previously described as process steps 12, 13 and 14. From the washed watermelons, juice is extracted and filtered by process step 43, which includes the steps previously described as steps 16, 17 and 18, after which the filtered watermelon juice is flash cooled by process step 44 to refrigeration temperature—between 34 and 40 degrees Fahrenheit, The cooled watermelon juice from process step 44 is then transferred to and shipped in tankers (process step 46) while being maintained at refrigeration temperature.

Referring to FIG. 3, watermelon juice 47 transported by process step 46 is introduced into a blending tank 48 having a high speed mixer into which ingredients are added as process step 49 (which is the same as process step 23 described above) to achieve a juice drink having the same ranges of parameters and flavor as described above in connection with process step 23. The juice drink adjusted according to process step 49 is mixed in process step 51 until well blended, after which it is pumped by pump 53 to heat exchanger 54 where it is quickly raised to a temperature of 190 degrees Fahrenheit and held at that temperature for between 10 and 30 seconds—preferably 20 seconds. Pump 56 then delivers the heated drink to a crash cooler 57 where the temperature is quickly brought down to within the range of 34 to 40 degrees Fahrenheit. From the crash cooler, the juice drink is subjected to process step 58 by which it is put into bottles of a selected size. The bottles are then capped and packaged and palletized for shipment to stores where the juice drink can be purchased. At all times after step 57, the juice is maintained at refrigeration temperature, including when displayed on store shelves.

An example of a watermelon juice drink made according to the present invention includes the following ingredients: water 25.87%; fresh watermelon juice with malic 65.13%; high fructose corn syrup 8.63%; malic acid 0.05%; liquid natural watermelon flavor 0.22%; and Carrageenan (gum) 0.10%. The ingredients are combined as follows: approximately half of the water is placed into a batch tank with a mixer that is turned on; the high fructose corn syrup is added to the water; the Carrageenan is then added to the mixer and dispersed until lumps disappear; approximately one quarter of the water is added; the watermelon juice is added to the batch tank; the °Brix are adjusted by adding more water; and the percentage of total acid as malic is checked and brought within the desired range.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A process for producing a watermelon fruit juice drink comprising:

pressing an entire, intact watermelon having an inner and outer rind, inner fruit flesh, and seeds to extract juice from inner and outer rind, inner fruit flesh, but not the seeds;

adjusting the juice by adding water and malic acid to make a fruit juice drink;

bringing the fruit juice drink to an elevated temperature; and then bringing the fruit juice drink to refrigeration temperature.

2. The process of claim 1 comprise the added step of washing the watermelon prior to pressing it.

3. The process of claim 2 wherein the watermelon is washed with a weak chlorine solution.

4. The process of claim 1 wherein the amount of malic acid added adjusts the pH of the fruit juice drink to at or below 4.3.

5. The process of claim 1 wherein the amount of malic acid added adjusts the pH of the fruit juice drink to within the range of 3.8 to 4.3.

6. The process of claim 1 wherein the amount of malic acid added adjusts the percent of titratable acid as malic to within the range of 0.27 to 0.33.

7. The process of clam 1 comprising the further step of adding sweetener.

8. The process of claim 7 wherein the amount of sweetener added adjusts the °Brix to within the range of 10 to 13.

9. The process of claim 1 wherein the drink is elevated to a temperature above 180 degrees Fahrenheit but below boiling.

10. The process of claim 1 wherein the drink is elevated to a temperature within the range 170 to 190 degrees Fahrenheit.

11. The process of claim 1 wherein the drink is elevated to temperature within the range of 170 to 190 degrees Fahrenheit for at least 20 seconds.

12. The process of claim 11 comprising the additional step of bottling the drink while at refrigeration temperature.

13. A process for producing a watermelon fruit juice comprising:

pressing an entire, intact watermelon having an inner and outer rind, inner fruit flesh, and seeds to extract Juice from the inner and outer rind, inner fruit flesh, but not the seeds;

bringing the fruit juice to an elevated temperature; and then bringing the fruit juice to refrigeration temperature.

14. The process of claim 13 comprising the additional step of bottling the juice while at refrigeration temperature and not significantly raising the temperature of the juice thereafter.

15. The process of claim 14 comprising the additional steps after elevating the temperature and prior to bottling, of transporting the juice while at refrigeration temperature.

16. The process of claim 15 comprising the additional step, after transporting the juice and before bottling the juice, of adjusting the juice by adding water, malic acid and sweetener.

17. The process of claim 16 comprising the additional step, after adjusting the juice and prior to bottling of:

elevating the temperature of the juice above 170 degrees Fahrenheit and a then cooling the juice to refrigeration temperature.

18. A process for making a commercial packaged watermelon fruit juice, drink comprising:

pressing an entire, intact watermelon having an inner and outer rind, inner fruit flesh, and seeds to extract juice from inner and outer rind, inner fruit flesh, but not the seeds;

filtering the extracted juice to remove solids;

adjusting the juice by adding water, malic acid, polysaccharide, sweetener, and natural flavor to make a fruit juice drink heaving between 57 and 74% watermelon juice, a TA range of 0.27 to 0.33, and °Brix in a range 10 to 13;

elevating the temperature of the drink above 170 degrees Fahrenheit for at least 15 seconds; then cooling the drink to refrigeration temperature; and bottling the drink while at refrigeration temperature.

19. The process of claim 18 comprising the additional steps between filtering and adjusting of:

elevating the temperature of the juice above 170 degrees Fahrenheit for at least 15 seconds; then cooling the juice to refrigeration temperature; and transporting the juice at refrigeration temperature.

* * * * *